United States Patent Office 3,354,138
Patented Nov. 21, 1967

3,354,138
PRODUCTION OF ANTISTATIC POLYMERS
Robert H. Burr, Bartlesville, Okla., assignor to Phillips Petroleum Company, a corporation of Delaware
No Drawing. Filed Nov. 22, 1963, Ser. No. 325,775
4 Claims. (Cl. 260—94.9)

This invention relates to the production of polymers and polymer products having improved antistatic properties.

Fibers, films, sheets and molded articles fabricated from resinous polymers of monoolefins are subject to the development of objectionable properties resulting from an accumulation of electrostatic charges thereupon. Fabricators are familiar with the attraction plastics have for dust and recognize that it is caused by an electrostatic charge. It makes film hard to handle in converting operations, causes machining particles to stick to parts, and results in products that require costly hand cleaning before final packaging.

Heretofore some alleviation of this problem has been realized by wiping the surface with an antistatic material such as various quaternary ammonium compounds and the like. Such treatment has been found to be effective for limited periods only since it is lost by evaporation, oxidation or simple mechanical removal from handling or contact with other articles.

Accordingly, an object of my invention is to produce an antistatic additive.

Another object of my invention is to provide polymeric compositions having improved antistatic properties.

Another object of my invention is to provide a process for the production of polymeric compositions having improved antistatic properties.

Another object of my invention is to provide polymer products having improved antistatic properties.

Another object of my invention is to provide a process for the production of polymer products having improved antistatic properties.

Other objects, advantages and features of my invention will be readily apparent to those skilled in the art from the following description and the appended claims.

I have discovered that improved protection against the development of electrostatic charges in polyolefin polymers can be realized by incorporation therein of a mixture comprising mineral oil and polyethylene glycol.

The invention is applicable to plastic materials prepared from the polymerization of 1-olefins having a maximum of six carbon atoms per molecule. The polymerization product can be a homopolymer or a copolymer, or a mixture thereof. Applicable plastic materials include polymers of 1-olefins typified by ethylene, propylene, 1-butene, 1-pentene, 3-methyl-1-pentene and copolymers of such olefins as ethylene-propylene copolymers, ethylene-butene-1 copolymers, etc.

The inventive polymeric composition having improved antistatic properties can be produced by melt blending a 1-olefin polymer with polyethylene glycol and mineral oil. Preferably, the polymeric composition of my invention contains a concentration of mineral oil in the range of 0.1–5 weight percent and a concentration of polyethylene glycol in the range of 0.1–2 weight percent. It is also within the scope of this invention to include a coloring agent or pigment such as titanium oxide in the polymeric composition. Although not to be limited thereto, pigment concentrations in the range of 0.1–2.5 weight percent are normally employed.

Preferably, although not to be limited thereto, the additive agents (pigment, polyethylene glycol, mineral oil) are premixed or blended and the mixture melt blended with a 1-olefin polymer. The additive agents can also be passed separately to the blending zone and blended therein with the 1-olefin polymer or the 1-olefin polymer containing one or more of the other of said additives. The blending of the polymeric composition can be effected in a Banbury mixer or other means of blending and dispersing the additive agents throughout the 1-olefin polymer.

Polyethylene glycol employed in the preparation of the polymeric composition has a molecular weight in the range of 285 to 630. Preferably, but not to be limited thereto, the mineral oil employed will have a specific gravity in the range of 0.84 to 0.94 and an initial boiling point of at least about 360° F.

The polymeric composition can be prepared as a concentrate and the concentrate blended with additional 1-olefin polymer to produce a final 1-olefin polymer product containing the desired concentration of polyethylene glycol and mineral oil. The 1-olefin polymer used in preparing the concentrate can be the same or different from the 1-olefin polymer employed to produce the final product. In the preparation of the concentrate, the polyethylene glycol and mineral oil can be melt blended with the 1-olefin polymer to produce a concentrate, for example, wherein the concentration of polyethylene glycol is in the range of 2–40 weight percent and the concentration of mineral oil is in the range of 2–10 weight percent. The concentrate can then be extruded and pelletized.

The solid, pelletized concentrate then can be mixed with the additive-free pelletized 1-olefin polymer in a cone or ribbon type blender and the mixture passed to a conventional extruder and pelletized to produce a final pelletized 1-olefin polymer containing the additives of desired concentration.

Articles produced from the pelletized 1-olefin polymer by conventional blow molding processes, and the like, preferably are flame treated so that the surface of the formed article attains immediately a maximum resistance to the accumulation of electrostatic charges thereupon. The invention is not limited to the flame treating step. It has been observed that the resistance to the accumulation of electrostatic charges on articles formed from polymeric compositions containing the antistatic additive is increased with the passage of time until a maximum resistance is attained. Flame treating of the formed polymer product can be obtained by employing conventional natural gas-air flame treating equipment such as manufactured by Flynn Burner Corp., New Rochelle, N.Y.

The following examples illustrate the effectiveness of the invention although it is not intended that the invention should be limited to the specific embodiments presented therein.

*Example I*

Two 10-ounce Boston-round bottles produced by blow molding high density polyethylene having a density of 0.960 as determined by ASTM D1505–57T and a melt index of 0.9 as determined by ASTM D1238–57T and flame treated were rubbed 10 times with a paper towel (Kim-wipe, manufactured by Kimberly-Clark Corporation of Neenah, Wis.) and placed in a closed chamber at low relative humidity (less than 20 percent) for a period of 24 hours. At the end of the 24-hour period a 4-inch diameter filter paper saturated with toluene was burned inside the closed chamber and the resulting soot blown throughout the chamber for a period of 15 minutes. At the conclusion of the 15-minute period, the test samples were checked for soot pick-up (electrostatic charge) employing the following rating system:

(1) No soot
(2) A few specks of soot
(3) A thin covering of soot
(4) A heavy covering of soot
(5) A definite pattern is imparted to the soot pickup.

The above test samples had a heavy covering of soot and were given a 4 rating.

*Example II*

The polyethylene of Example I was melt blended with Carbowax 400 (polyethylene glycol having an average molecular weight in the range of 380–420) and a white mineral oil having the following properties:

| | |
|---|---|
| A.P.T. gravity | 28.4 |
| Specific gravity at 60° F. | 0.885 |
| Flash point, ° F. | 430 |
| Saybolt viscosity at 100° F. | 350 |
| Saybolt viscosity at 210° F. | 53 |
| Initial boiling point, ° F. | 600 | to produce a blend (A) containing 0.7 weight percent Carbowax 400 and 0.2 weight percent mineral oil, and a blend (B) containing 0.35 weight percent Carbowax 400 and 0.2 weight percent mineral oil.

As in Example I, 10-ounce Boston-round blow-molded bottles were produced using blends A and B. Two blow-molded bottles of each of blends A and B were tested as in Example I. The bottles contained no soot on the surfaces and were given a rating of 1.

Comparison of the results obtained in Examples I and II clearly demonstrate the effectiveness of the invention to improve the antistatic properties of 1-olefin polymers.

Various modifications can be made, or followed, in view of the foregoing disclosure and discussion, without departing from the spirit or scope thereof.

I claim:

1. A process which comprises melt blending a 1-olefin polymer prepared from the polymerization of a 1-olefin having a maximum of 6 carbon atoms per molecule with polyethylene glycol and mineral oil, forming an article from the resulting blend, and flame treating said formed article.

2. The process of claim 1 to include blending a pigment with said 1-olefin polymer, polyethylene glycol, and mineral oil.

3. A process which comprises melt blending a 1-olefin polymer prepared by the polymerization of a 1-olefin having a maximum of 6 carbon atoms per molecule with polyethylene glycol and mineral oil, forming a solid 1-olefin polymer concentrate containing polyethylene glycol and mineral oil, blending said concentrate with a 1-olefin polymer prepared by the polymerization of a 1-olefin having a maximum of 6 carbon atoms per molecule, forming an article from the blend of said concentrate and polymer, and flame treating said formed article.

4. A process which comprises forming a product from a polymeric composition comprising a 1-olefin polymer prepared from 1-olefins having a maximum of 6 carbon atoms per molecule, polyethylene glycol, and mineral oil, and flame treating the formed product within two weeks after said product is formed.

References Cited

UNITED STATES PATENTS

| | | | |
|---|---|---|---|
| 2,497,536 | 2/1950 | Chandler | 117—139.5 |
| 2,920,980 | 12/1960 | Mooberry | 117—138.8 |

FOREIGN PATENTS

| | | |
|---|---|---|
| 650,759 | 3/1951 | Great Britain. |
| 781,171 | 8/1957 | Great Britain. |

OTHER REFERENCES

Renfrew and Morgan, Polythene, 1957, p. 421.

JOSEPH L. SCHOFER, *Primary Examiner.*

L. EDELMAN, *Assistant Examiner.*